(12) United States Patent
Arya

(10) Patent No.: US 12,515,560 B2
(45) Date of Patent: Jan. 6, 2026

(54) SYSTEM AND METHOD FOR CONTROLLING A FUEL CELL ENERGY SYSTEM OF A VEHICLE

(71) Applicant: Volvo Truck Corporation, Gothenburg (SE)

(72) Inventor: Pranav Arya, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 233 days.

(21) Appl. No.: 18/281,631

(22) PCT Filed: Apr. 7, 2021

(86) PCT No.: PCT/EP2021/059060
§ 371 (c)(1),
(2) Date: Sep. 12, 2023

(87) PCT Pub. No.: WO2022/214170
PCT Pub. Date: Oct. 13, 2022

(65) Prior Publication Data
US 2024/0149749 A1     May 9, 2024

(51) Int. Cl.
*B60L 58/30* (2019.01)
*B60L 50/75* (2019.01)
(Continued)

(52) U.S. Cl.
CPC ............ *B60L 58/30* (2019.02); *B60L 50/75* (2019.02); *B60L 55/00* (2019.02); *B60L 58/13* (2019.02);
(Continued)

(58) Field of Classification Search
CPC .......... B60L 58/30; B60L 55/00; B60L 50/75; B60L 58/13; B60L 2260/22;
(Continued)

(56) References Cited

U.S. PATENT DOCUMENTS

2002/0177504 A1* 11/2002 Pels ..................... B60K 6/48
477/6
2007/0282495 A1   12/2007 Kempton et al.
(Continued)

FOREIGN PATENT DOCUMENTS

| DE | 102019200949 A1 | | 7/2020 |
|----|----|----|----|
| DE | 102019126305 A1 | | 4/2021 |
| EP | 10 2019200949 | * | 1/2019 |
| WO | 09058111 A1 | | 5/2009 |

OTHER PUBLICATIONS

M. Phattanasak, et al."Control of a Hybrid Energy Source Comprising a Fuel Cell and Two Storage Devices Using Isolated Three-Port Bidirectional DC-DC Converters," in IEEE Transactions on Industry Applications, vol. 51, n (Year: 2014).*

(Continued)

*Primary Examiner* — Gertrude Arthur Jeanglaude
(74) *Attorney, Agent, or Firm* — Withrow & Terranova, PLLC

(57) ABSTRACT

A method of controlling an energy storage system in a vehicle, the energy storage system comprising a fuel cell energy conversion device and a junction box configured to connect the fuel cell energy conversion device to one of a bi-directional charging port and an electrical propulsion system. The method comprises determining a change in a vehicle operational status from a driving mode to a standstill mode; estimating a standstill duration; and based on a known relation between fuel cell degradation and fuel cell shut down duration for the fuel cell energy conversion device, determining if the fuel cell energy conversion device is to be active or shut down during the standstill.

13 Claims, 5 Drawing Sheets

(51) Int. Cl.
  *B60L 55/00*    (2019.01)
  *B60L 58/13*    (2019.01)
  *H01M 8/04303*   (2016.01)
  *H01M 8/04664*   (2016.01)

(52) U.S. Cl.
  CPC ... *H01M 8/04303* (2016.02); *H01M 8/04671* (2013.01); *B60L 2260/22* (2013.01); *B60L 2260/44* (2013.01); *H01M 2250/20* (2013.01)

(58) Field of Classification Search
  CPC .......... B60L 2260/44; H01M 8/04303; H01M 8/04671; H01M 2250/20
  See application file for complete search history.

(56) References Cited

U.S. PATENT DOCUMENTS

| | | | |
|---|---|---|---|
| 2009/0212626 A1* | 8/2009 | Snyder | B60L 15/209 903/930 |
| 2011/0087389 A1* | 4/2011 | Burleigh | B60L 58/33 701/22 |
| 2012/0171585 A1 | 7/2012 | Mueller et al. | |
| 2014/0303821 A1 | 10/2014 | Oda | |

OTHER PUBLICATIONS

International Search Report and Written Opinion for International Patent Application No. PCT/EP2021/059060, mailed Jan. 4, 2022, 14 pages.

\* cited by examiner

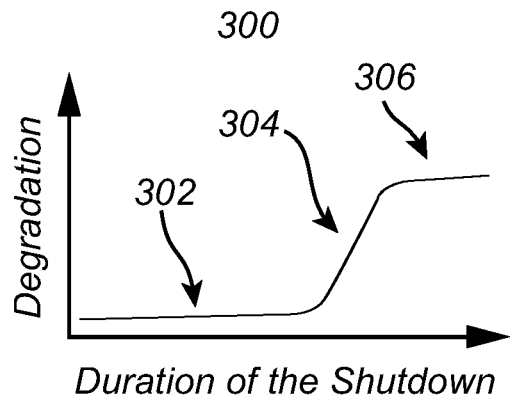 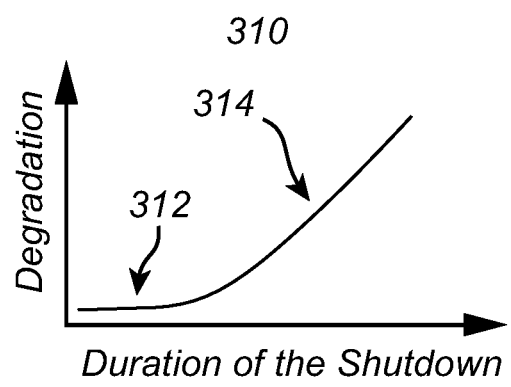
Fig. 3A
Fig. 3B
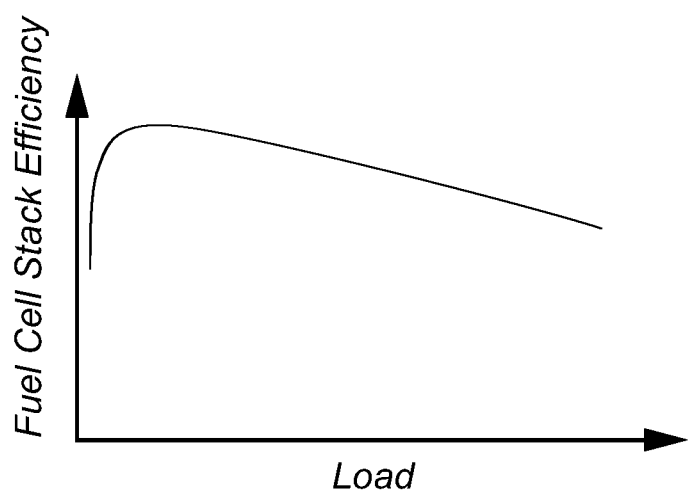
Fig. 4

SYSTEM AND METHOD FOR CONTROLLING A FUEL CELL ENERGY SYSTEM OF A VEHICLE

This application is a 35 USC 371 national phase filing of International Application No. PCT/EP2021/059060, filed Apr. 7, 2021, the disclosure of which is incorporated herein by reference in its entirety.

TECHNICAL FIELD

The invention relates to a method and system for controlling the operation of a fuel cell energy conversion unit in a vehicle.

The invention can be applied in heavy-duty vehicles, such as trucks, buses and construction equipment. Although the invention will be described with respect to a truck, the invention is not restricted to this particular vehicle, but may also be used in other vehicles comprising fuel cells for providing power to the vehicle.

BACKGROUND

There is an increasing development of alternative power sources and propulsion systems for heavy vehicles aimed at supplementing or replacing combustion engines. One such power source is a fuel cell system capable of converting hydrogen into electrical energy where the electrical energy in turn can be used for vehicle propulsion.

When using a fuel cell power system in a heavy vehicle, the requirements and operating conditions may be different compared to for fuel cells in cars. For example, heavy vehicles will more commonly comprise additional power sources and it is also more likely that a heavy vehicle such as a truck can have higher energy requirements for system aside from the propulsion system. Moreover, in a vehicle comprising a plurality of power sources it is desirable to optimize the operation of the power system to achieve the best possible efficiency and life length for each of the power sources.

Accordingly, it is desirable to improve the operation of a power system for a vehicle comprising fuel cells.

SUMMARY

An object of the invention is to provide a method of controlling an energy storage system in a vehicle which aims to optimize the life length of the fuel cells by minimizing fuel cell degradation caused by shut down and restart of the fuel cell energy conversion device.

According to a first aspect of the invention, the object is achieved by a method according to claim 1.

Claim 1 describes a method of controlling an energy storage system in a vehicle. The energy storage system comprises a fuel cell energy conversion device and a junction box configured to connect the fuel cell energy conversion device to one of a bi-directional charging port and an electrical propulsion system. The method comprises: determining a change in a vehicle operational status from a driving mode to a standstill mode; estimating a standstill duration; and based on a known relation between fuel cell degradation and fuel cell shut down duration for the fuel cell energy conversion device, determining if the fuel cell energy conversion device is to be active or shut down during the standstill.

The present invention is based on the realization that the life-length of fuels cells in a vehicle power system by determining if the fuel cells should be shut down or not during a vehicle standstill. In particular, shutting down and restarting the fuel cells may degrade the fuel cells more that leaving the fuel cell system active during a stop. The relation between fuel cell degradation and fuel cell shut down duration can be determined analytically or empirically for a given implementation and system. Thereby, based on such a known relation, fuel cell degradation can be minimized. When the fuel cell energy conversion device is active, energy is generated, and the energy needs to be taken care of in the most advantageous manner. Several options on how to operate the fuel cell energy conversion device will be described in the following.

According to one embodiment of the invention, the method further comprises: determining an energy needed by the vehicle in the standstill mode based on the standstill duration and based on at least one other parameter characterizing the standstill; determining a fuel cell load required for supplying the energy needed by the vehicle; and based on a known relation between fuel cell operating efficiency and the required fuel cell load, determining if the fuel cells are operated to provide only the energy needed by the vehicle or if the fuel cells are operated to generate energy in addition to the energy needed by the vehicle during standstill.

A heavy vehicle such as a truck may require substantial amounts of energy also during standstill, for example for keeping a sleeping cabin heated or cooled, or if other systems of the vehicle will require energy. Thereby, by using at least one other parameter characterizing the standstill in addition to the duration, it can be determined more accurately how to operate the fuel cells to minimize degradation. The additional parameter may for example be information provided by the navigation system or by the driver indicating if the stop is a scheduled stop including a longer stat in the cabin. The additional parameter may also be information about a loading/unloading cycle requiring a certain amount of energy. The ambient temperature can also be taken into account since it may influence both the vehicle energy need and the fuel cell degradation. Thereby, the energy need and corresponding fuel cell load for providing the energy can be determined.

The operating efficiency of the fuel cell load is dependent on the fuel cell load. In particular, if the energy required by the vehicle would cause the fuel cells to operate at less than optimal efficiency, the fuel cells can be controlled to generate additional energy.

According to one embodiment of the invention, the method further comprising: when it is determined that the energy needed by the vehicle in the standstill mode is below a predetermined energy threshold value, operating the fuel cells to provide energy at or above the predetermined energy threshold value. To avoid operating the fuel cells at very low load levels where fuel cell degradation is exacerbated, the fuel cells are controlled to provide additional energy to reduce fuel cell degradation.

According to one embodiment of the invention, the method further comprises: determining an energy needed by the vehicle in the standstill mode based on the standstill duration and based on at least one other parameter characterizing the standstill; determining a fuel cell load required for supplying the energy needed by the vehicle; determining a fuel cell degradation for the standstill duration if the fuel cell energy conversion device is shut down; determining a fuel cell degradation for the standstill duration if the fuel cell energy conversion device provides the energy needed by the vehicle during standstill; and selecting the option of fuel cell shut down or fuel cell energy conversion resulting in the lowest fuel cell degradation.

According to one embodiment of the invention, the method further comprises: when the operating efficiency of the fuel cells can be increased by generating energy exceeding the energy needed by the vehicle, operating the fuel cells to generate energy exceeding the energy needed by the vehicle during standstill. Moreover, fuel cells are advantageously operating at an optimum efficiency during standstill.

According to one embodiment of the invention, the method further comprises: detecting a connection to an external power supply capable of receiving power; and when the fuel cells are operated to generate energy in addition to the energy required by the vehicle during standstill, provide surplus power to the external power supply, wherein the amount of surplus power to be provided to the grid is based on a selling price of energy provided to the grid. Power generated by the fuel cells can thereby be provided to an external power supply such as a power grid or a battery. Moreover, surplus power may be sold to the power grid when it is profitable to do so. In particular, depending on the sales price of energy provided to the grid and depending on the cost of generating energy both in terms of fuel cost and in terms of the cost for fuel cell degradation, it can be determined if it is profitable to generate energy in the vehicle and to sell the energy to the grid. Accordingly, the total cost of ownership of the vehicle can be optimized. Other aspects described above may also be taken into account to optimize the cost of ownership, such as fuel cell efficiency at different load levels and also that the sales price of energy to the grid may vary over time.

According to one embodiment of the invention, the method further comprises: determining a state-of charge of a battery located in the vehicle; and when the fuel cells are operated to generate energy in addition to the energy required by the vehicle during standstill, provide surplus energy to the battery if the state-of-charge of the battery is below a predetermined threshold value. In a vehicle power system comprising a battery, it may be advantageous to use surplus energy to charge a battery of the vehicle. This may allow the fuel cells to be operated at a high efficiency and to avoid fuel cell degradation.

There is also provided a computer program comprising program code means for performing the steps of any of the aforementioned embodiments when the program is run on a computer, and a computer readable medium carrying a computer program comprising program code means for performing the steps of any of the aforementioned embodiments.

According to a second aspect of the invention, the object is achieved by an energy storage system in a vehicle comprising: a fuel cell energy conversion device; a junction box connecting the fuel cell energy conversion device to one of a bi-directional charging port and an electrical propulsion system; and an energy storage system control unit configured to: determine a change in a vehicle operational status from a driving mode to a standstill mode; estimate a standstill duration; and based on a known relation between fuel cell degradation and fuel cell shut down duration for the fuel cell energy conversion device, control the fuel cell energy conversion device to be active or to be shut down during the standstill.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3A and 3B are graphs describing features of a fuel cell in an energy storage system according to an embodiment of the invention, FIG. 4 is a graph describing features of a fuel cell in an energy storage system according to an embodiment of the invention.

DETAILED DESCRIPTION OF EXAMPLE EMBODIMENTS OF THE INVENTION

In the present detailed description, various embodiments of an energy storage system and a method for controlling an energy storage system according to the present invention are mainly discussed with reference to an energy storage system in a truck. It should be noted that this by no means limits the scope of the present invention which is equally applicable to energy storage systems in other types of vehicles, and in particular in heavy vehicles.

Figure 1:
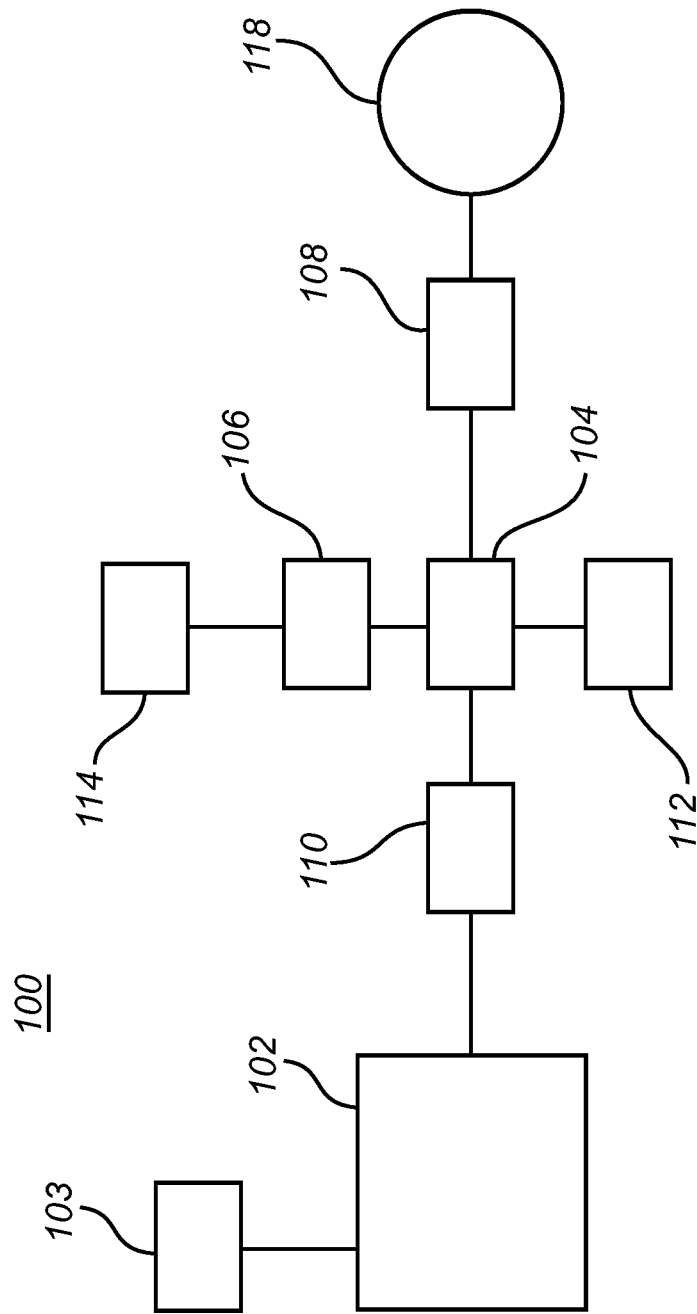
FIG. 1 is a block chart illustrating parts of an energy storage system according to an embodiment of the invention.

FIG. 1 schematically illustrates an energy storage system 100 for a vehicle comprising a fuel cell energy conversion device 102, a hydrogen tank system 103, a junction box 104 connecting the fuel cell energy conversion device 102 to at least one of a bi-directional charging port 106 and an electrical propulsion system 108. The bi-directional charging port is capable of both receiving energy from and providing energy to an external power supply. Such an external power supply may for example be a charging station connected to the power grid, a battery or another vehicle.

The energy storage system 100 may optionally also comprise a battery 112 such as a high voltage battery configured to provide power to the electrical propulsion system 108. The electrical propulsion system 108 can be considered to comprise one or more electrical machines connected to one or more wheels 118 of the vehicle, either directly or via a transmission arrangement. The vehicle may further comprise a combustion engine (not shown) for vehicle propulsion, and the combustion engine, battery, and fuel cells can together be controlled to provide power to the vehicle in an efficient manner.

The energy storage system 100 further comprises an energy storage system control unit (not shown) configured to control the energy storage system 100. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. Moreover, the described functionality of the energy storage system control unit may be provided by one or more vehicle ECUs (Electronic Control Units).

Figure 2:
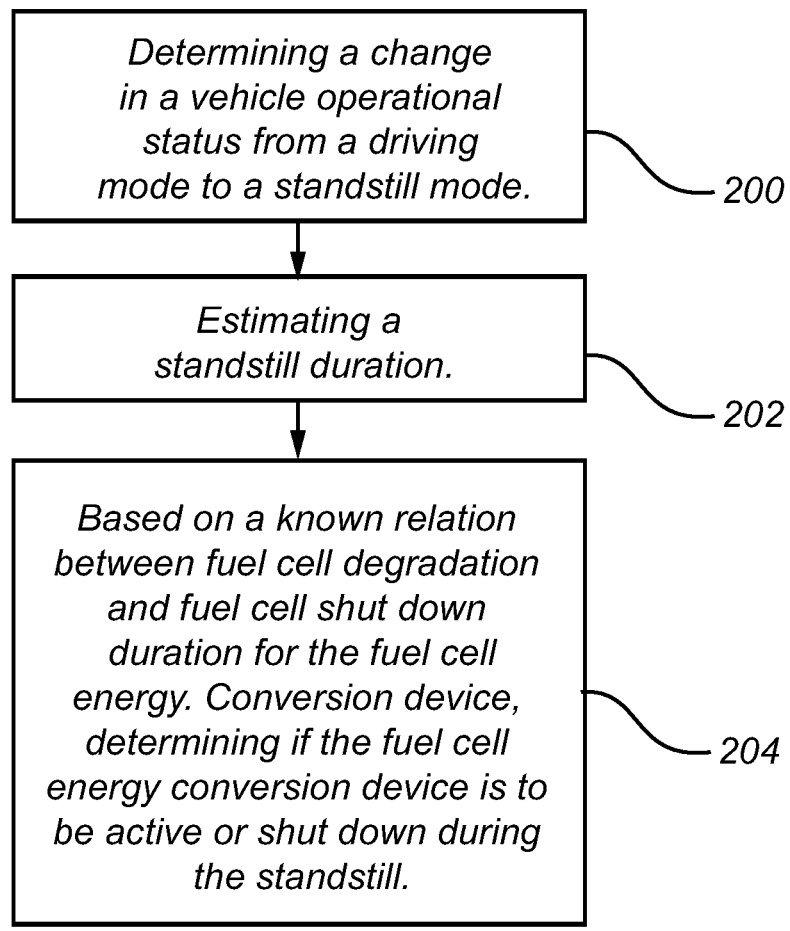
FIG. 2 is a flow chart outlining steps of a method of controlling an energy storage system according to an embodiment of the invention.

The functionality of the control unit is first described with reference to the flow chart of FIG. 2 outlining steps of a method according to an embodiment of the invention. The control unit is configured to perform the method comprising the steps of determining 200 a change in a vehicle operational status from a driving mode to a standstill mode. There are many ways to determine that the vehicle has entered a standstill mode, such as based on input from a navigation system or from driver input. A standstill mode can be defined as a stop lasting more than e.g. some minutes. In other words, if the vehicle stops at a red light or is standing still in traffic, this is typically not considered as a standstill mode unless specifically defined otherwise.

Next, a standstill duration is estimated 202. The reason for standstill may for example be a lunch break, a mandatory rest for the driver, an overnight stay, ferry transportation or other types of stops where the duration of the stop can be estimated with reasonable accuracy either by the driver or by a vehicle system. Accordingly, the standstill duration can be estimated automatically based on one or more input parameters from vehicle systems, or it can be set manually be the driver.

Next, based on a known relation between fuel cell degradation and fuel cell shut down duration for the fuel cell energy conversion device, the method comprises determining 204 if the fuel cell energy conversion device 102 is to remain active or if it is to be shut down during the standstill.

FIGS. 3A and 3B are graphs illustrating example relations between fuel cell degradation and fuel cell shut down duration for the fuel cell energy conversion device. However, fuel cell degradation is a complex phenomenon which can vary depending on the control strategies and on system properties. Accordingly, to ensure that the accuracy of the model describing the relation between fuel cell degradation and standstill duration is as accurate as possible, the model is preferably determined and tuned based on parameters describing a specific system. However, in general, fuel cell degradation is more severe for longer shutdown durations.

FIG. 3A illustrates an example graph 300 where the degradation has a slow linear increase during a first time period 302 after shutdown. At a certain point in time, the degradation increases more rapidly 304 followed by another period of slow increase 306 in degradation. After a longer period of time such as 24-48 h, the degradation can be considered to be constant over time.

FIG. 3B illustrates an example where the degradation has a first linear increase 312 followed by a period 314 of gradually increasing degradation which can be assumed to later level out. The degradation over time can be at least partially controlled based on a selected control strategy of the fuel cells. Thereby, the most advantageous control strategy for a given duration can be selected. Taking the general examples in FIGS. 3A and 3B, for a longer stop it may thus be more advantageous to use a control strategy resulting in the fuel cell degradation of FIG. 3A.

The known relation between fuel cell degradation and fuel cell shut down duration for the given system is thus used to determine and control if the fuel cells are shut down or not during standstill. The determination may for example be made based on a degradation threshold, where it is determined to shut down the fuel cells if the expected duration would lead to degradation above a predetermined degradation threshold. Moreover, the decision whether to operate the fuel cells or to shut them down during standstill may depend on a range of additional parameters as will be elaborated in the following.

Figure 5:
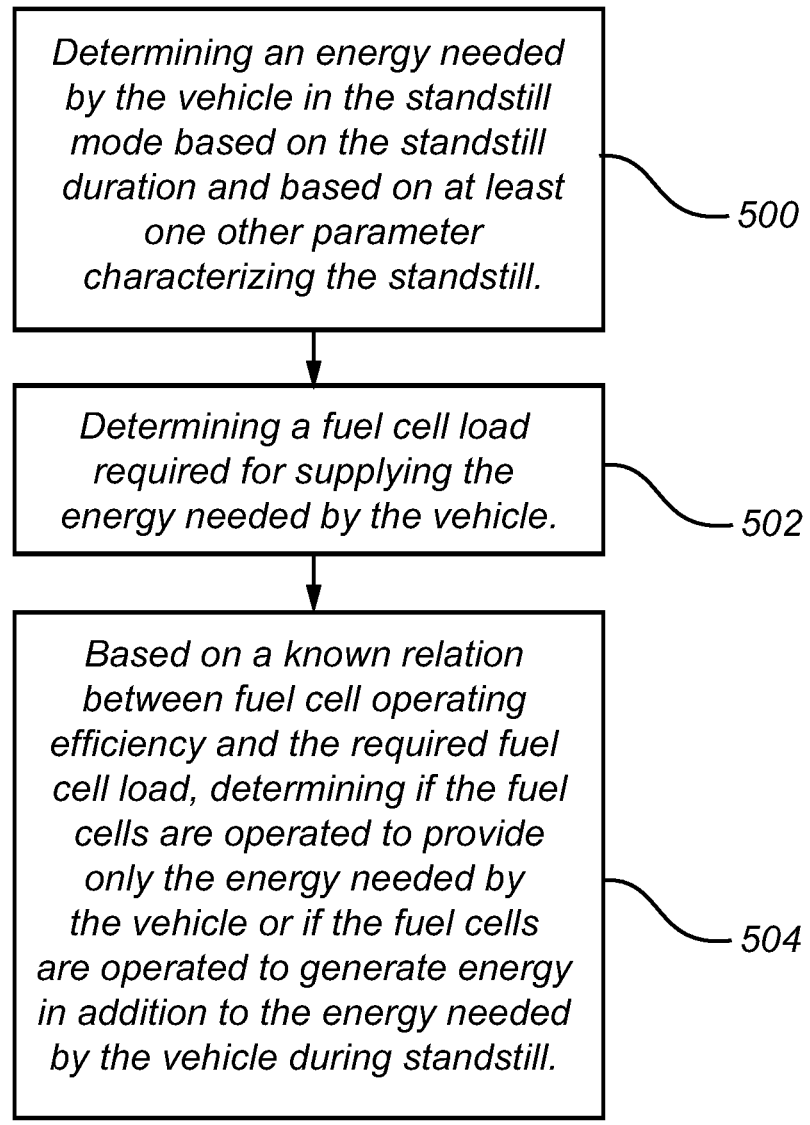
FIG. 5 is a flow chart outlining steps of a method of controlling an energy storage system according to an embodiment of the invention.

According to one embodiment of the invention outlined by the flow chart of FIG. 5, the method further comprises determining 500 an energy needed by the vehicle in the standstill mode based on the standstill duration and based on at least one other parameter characterizing the standstill. An energy requirement for the vehicle can be assumed to be estimated with sufficient accuracy if the duration and nature of the standstill is known. In particular, the reason for standstill can be used to estimate the energy need, and the reason for standstill can for example be fuel stop, lunch break, loading/unloading, overnight stop, ferry transportation, or any other reason which may or may not require energy. Accordingly, based on the nature of the stop, and/or based on input of the driver, the energy required by the vehicle can be determined. An example scenario is that the driver stops for the night and intends to sleep in the cabin, which means that the cabin may require heating during the night. Another parameter characterizing the standstill is if the vehicle is connected to an external charging or not, and if such a charging station is capable of receiving energy produced by the vehicle, which will be discussed in further detail in the following.

Next, the method comprises determining 502 a fuel cell load required for supplying the energy needed by the vehicle during the standstill. The energy conversion properties of the fuel cell system can be considered to be known with high accuracy so that a resulting fuel cell load can be determined based on the estimated energy need.

Furthermore, based on a known relation between fuel cell operating efficiency and the required fuel cell load, it is determined 504 if the fuel cells are operated to provide only the energy needed by the vehicle or if the fuel cells are operated to generate energy in addition to the energy needed by the vehicle during standstill. FIG. 4 schematically outlines an example of the fuel cell efficiency as a function of fuel cell load. Here it can be seen that the efficiency is low for very low loads. Thereby, if energy requirements of the vehicle results in a fuel cell low load, it can be determined that the fuel cells are to be shut down and that the required energy is provided by another power source such as a battery.

Figure 6:
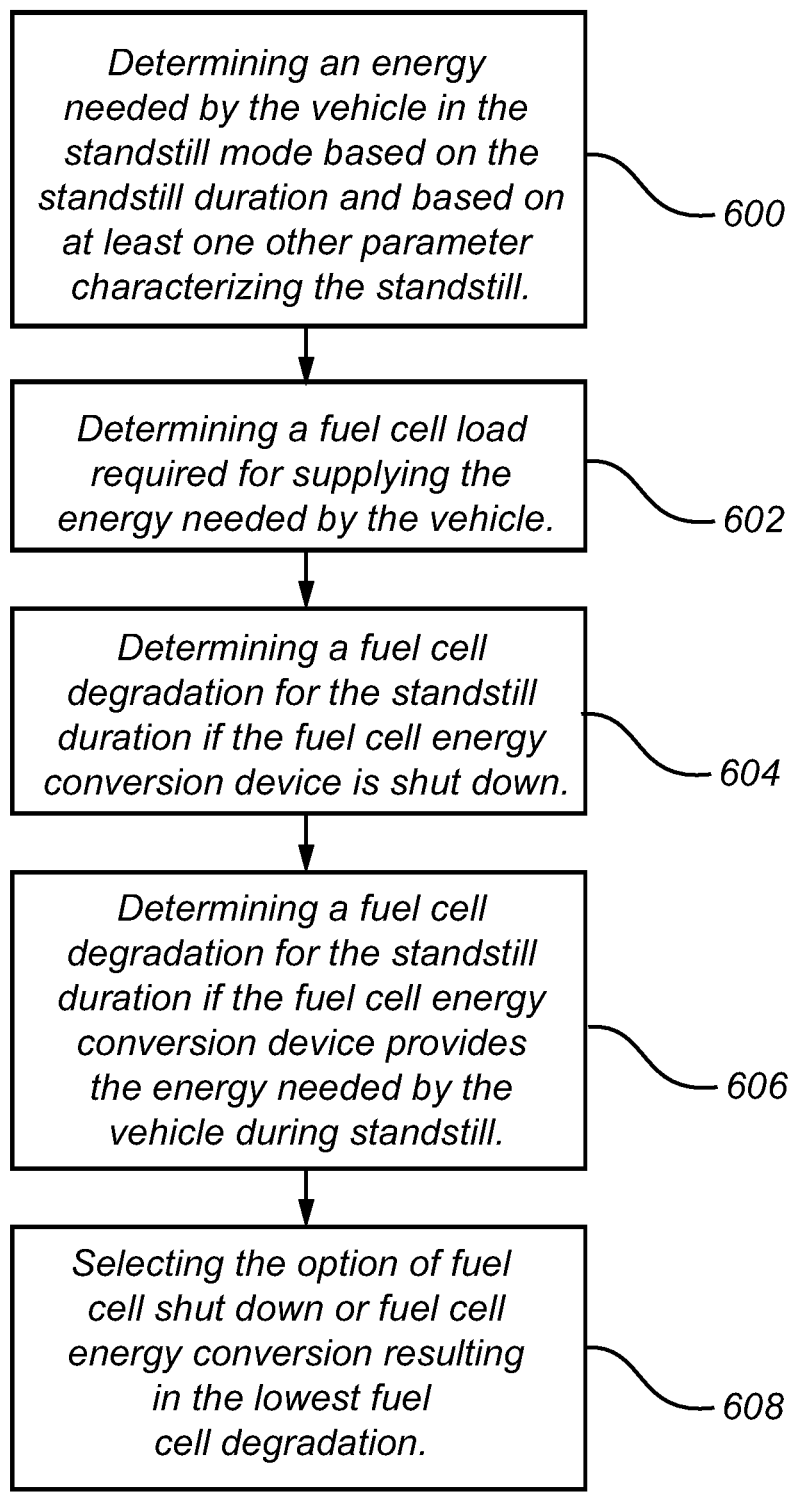
FIG. 6 is a flow chart outlining steps of a method of controlling an energy storage system according to an embodiment of the invention.

FIG. 6 is a flow chart outlining steps of a method according to another embodiment of the invention. The method comprises determining 600 an energy needed by the vehicle in the standstill mode based on the standstill duration and based on at least one other parameter characterizing the standstill. Examples of parameters used to determine the energy needed by the vehicle are described above.

Next, the method comprises determining 602 a fuel cell load required for supplying the energy needed by the vehicle, determining 604 a fuel cell degradation for the standstill duration if the fuel cell energy conversion device is shut down and determining 606 a fuel cell degradation for the standstill duration if the fuel cell energy conversion device provides the energy needed by the vehicle during standstill. Based on the aforementioned determinations, the method comprises selecting 608 the option of fuel cell shut down or fuel cell energy conversion resulting in the lowest fuel cell degradation. If the fuel cells are shut down, the energy required by the vehicle can be provided by e.g. a battery or from an external power source.

There is also a certain fuel cell degradation taking place during operation of the fuel cells which must be weighed against the degradation occurring as a result of shut down. The degradation during operation of the fuel cells is dependent on the fuel cell load, where the degradation is comparatively high for a very low load. Accordingly, for very low loads, the fuel cell efficiency is low, and the degradation is high. There may thus be situations where it is desirable to operate the fuel cells to provide more energy than what is required by the vehicle to in effect reduce fuel cell degradation. The excess energy provided by the fuel cells can then be used to charge an internal battery or it can be provided to the grid if possible. Another factor influencing the decision to generate surplus energy can be the price of energy provided the grid or to any other external power storage. Accordingly, it may be profitable to sell energy to the grid if the cost of producing the energy is lower than the price paid for the generated energy, and/or if the generation of surplus energy results in lower fuel cell degradation.

Another factor which may be taken into account in the above described method is the temperature, where a lower ambient temperature may lead to a higher energy need form the vehicle, for example for heating a cabin. The fuel cell degradation due to fuel cell shut down is also temperature dependent where lower temperatures leads to higher degradation of the fuel cells. Accordingly, at lower temperatures it is more desirable to avoid shutting down the fuel cells during standstill. However, the generated energy must be stored or used, either in the vehicle or provided to an external power source such as a power grid. Moreover, low temperatures may also lead to a higher energy price in which case it may be more advantageous to provide energy from the fuel cells to a power grid compared to storing the energy in a battery of the vehicle. Moreover, in such situations the fuel cells can be controlled to operate with a high efficiency.

In any of the above scenarios, the fuel cells can also be operated to generate energy exceeding the energy needed by the vehicle during standstill if this leads to an increase in the operating efficiency of the fuel cells. Based on the general relation between fuel cell efficiency and fuel cell load in FIG. 4, an example scenario is when the energy required by the vehicle is low in which case it may be preferable to increase the load of the fuel cells and to use the additional energy elsewhere. This gives the opportunity to operate the fuel cells at an optimum fuel cell efficiency.

Moreover, the described method and system may also comprise determining a state-of charge of a battery located in the vehicle; and when the fuel cells are operated to generate energy in addition to the energy required by the vehicle during standstill, provide surplus energy to the battery if the state-of-charge of the battery is below a predetermined threshold value. Thereby, an on-board battery can be charged before excess energy is provided to the power grid.

The energy storage system control unit is configured to control the energy storage system 100 illustrated in FIG. 1 to perform the steps of any of the embodiments described above.

It is to be understood that the present invention is not limited to the embodiments described above and illustrated in the drawings; rather, the skilled person will recognize that many changes and modifications may be made within the scope of the appended claims.

The invention claimed is:

1. A method of controlling an energy storage system in a vehicle, the energy storage system comprising a fuel cell energy conversion device and a junction box configured to connect the fuel cell energy conversion device to one of a bi-directional charging port and an electrical propulsion system, wherein the method comprises:
   determining a change in a vehicle operational status from a driving mode to a standstill mode;
   estimating a standstill duration;
   based on a known relation between fuel cell degradation and fuel cell shut down duration for the fuel cell energy conversion device, determining if the fuel cell energy conversion device is to be active or shut down during the standstill;
   determining an energy needed by the vehicle in the standstill mode based on the standstill duration and based on at least one other parameter characterizing the standstill;
   determining a fuel cell load required for supplying the energy needed by the vehicle; and
   based on a known relation between fuel cell operating efficiency and the required fuel cell load, determining if fuel cells are operated to provide only the energy needed by the vehicle or if the fuel cells are operated to generate energy in addition to the energy needed by the vehicle during standstill.

2. The method of claim 1, further comprising: when the energy needed by the vehicle in the standstill mode is below a predetermined energy threshold value, operating the fuel cells to provide energy at or above the predetermined energy threshold value.

3. The method of claim 1, further comprising:
   determining an energy needed by the vehicle in the standstill mode based on the standstill duration and based on at least one other parameter characterizing the standstill;
   determining a fuel cell load required for supplying the energy needed by the vehicle;
   determining a fuel cell degradation for the standstill duration if the fuel cell energy conversion device is shut down;
   determining a fuel cell degradation for the standstill duration if the fuel cell energy conversion device provides the energy needed by the vehicle during standstill; and
   selecting the option of fuel cell shut down or fuel cell energy conversion resulting in the lowest fuel cell degradation.

4. The method of claim 1, further comprising:
   when the operating efficiency of the fuel cells can be increased by generating energy exceeding the energy needed by the vehicle, operating the fuel cells to generate energy exceeding the energy needed by the vehicle during standstill.

5. The method of claim 1, further comprising operating the fuel cells at an optimum efficiency during standstill.

6. The method of claim 1, further comprising:
   detecting a connection to an external power supply capable of receiving power; and
   when the fuel cells are operated to generate energy in addition to the energy required by the vehicle during standstill, provide surplus power to the external power supply, wherein the amount of surplus power to be provided to the grid is based on a selling price of energy provided to the grid.

7. The method of claim 1, further comprising:
- determining a state-of charge of a battery located in the vehicle; and
- when the fuel cells are operated to generate energy in addition to the energy required by the vehicle during standstill, provide surplus energy to the battery if the state-of-charge of the battery is below a predetermined threshold value.

8. A computer program comprising program code means for performing the steps of claim 1 when the program is run on a computer.

9. A computer readable medium carrying a computer program comprising program code means for performing the steps of claim 1 when the program product is run on a computer.

10. An energy storage system for a vehicle comprising:
- a fuel cell energy conversion device;
- a junction box connecting the fuel cell energy conversion device to one of a bi-directional charging port and an electrical propulsion system; and
- an energy storage system control unit configured to:
  - determine a change in a vehicle operational status from a driving mode to a standstill mode;
  - estimate a standstill duration;
  - based on a known relation between fuel cell degradation and fuel cell shut down duration for the fuel cell energy conversion device, control the fuel cell energy conversion device to be active or to be shut down during the standstill;
  - determine an energy needed by the vehicle in the standstill mode based on the standstill duration and based on at least one other parameter characterizing the standstill;
  - determine a fuel cell load required for supplying the energy needed by the vehicle; and
  - based on a known relation between fuel cell operating efficiency and the required fuel cell load, determine if fuel cells are operated to provide only the energy needed by the vehicle or if the fuel cells are operated to generate energy in addition to the energy needed by the vehicle during standstill.

11. The energy storage system of claim 10, further comprising a battery connected to the junction box, wherein the energy storage system control unit is further configured to:
- determine a state-of charge of the battery; and
- when the fuel cells are operated to generate energy in addition to the energy required by the vehicle during standstill, control the junction box to provide surplus energy to the battery if the state-of-charge of the battery is below a predetermined threshold value.

12. A vehicle comprising the energy storage system of claim 10.

13. A method of controlling an energy storage system in a vehicle, the energy storage system comprising a fuel cell energy conversion device and a junction box configured to connect the fuel cell energy conversion device to one of a bi-directional charging port and an electrical propulsion system, wherein the method comprises:
- determining a change in a vehicle operational status from a driving mode to a standstill mode;
- estimating a standstill duration;
- based on a known relation between fuel cell degradation and fuel cell shut down duration for the fuel cell energy conversion device, determining if the fuel cell energy conversion device is to be active or shut down during the standstill;
- determining an energy needed by the vehicle in the standstill mode based on the standstill duration and based on at least one other parameter characterizing the standstill;
- determining a fuel cell load required for supplying the energy needed by the vehicle;
- determining a fuel cell degradation for the standstill duration if the fuel cell energy conversion device is shut down;
- determining a fuel cell degradation for the standstill duration if the fuel cell energy conversion device provides the energy needed by the vehicle during standstill; and
- selecting the option of fuel cell shut down or fuel cell energy conversion resulting in the lowest fuel cell degradation.

* * * * *